UNITED STATES PATENT OFFICE.

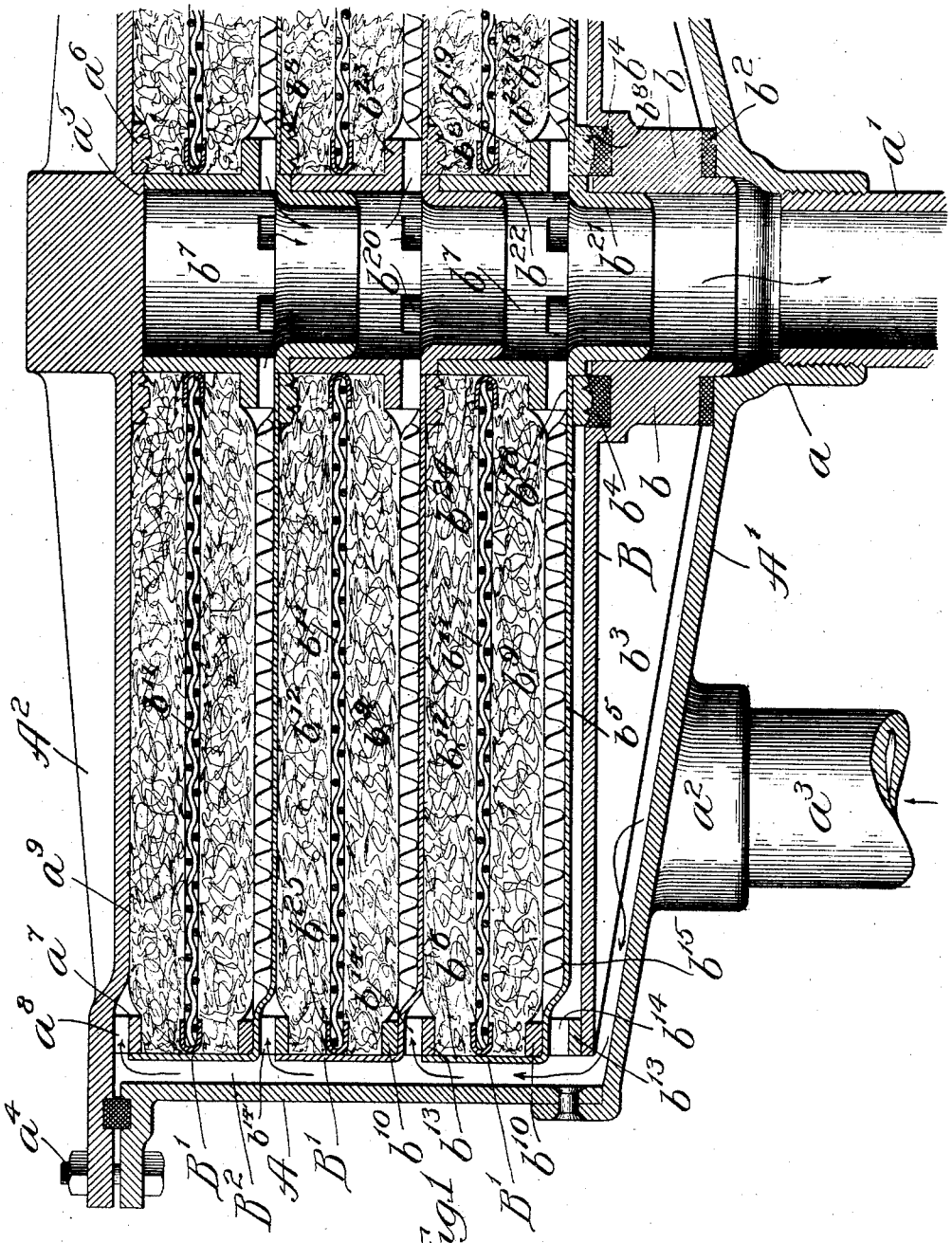

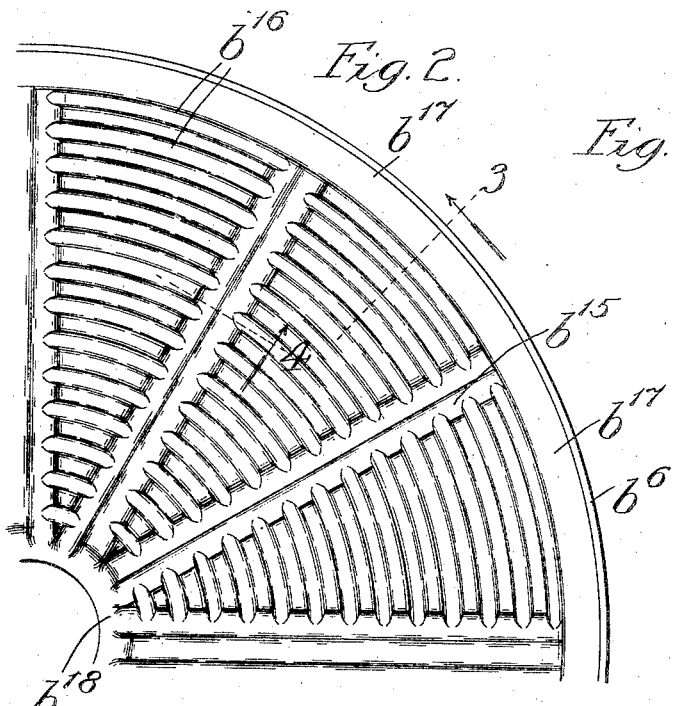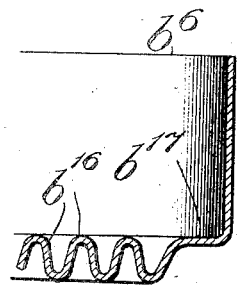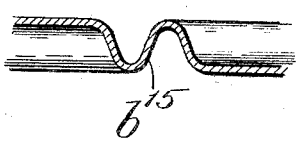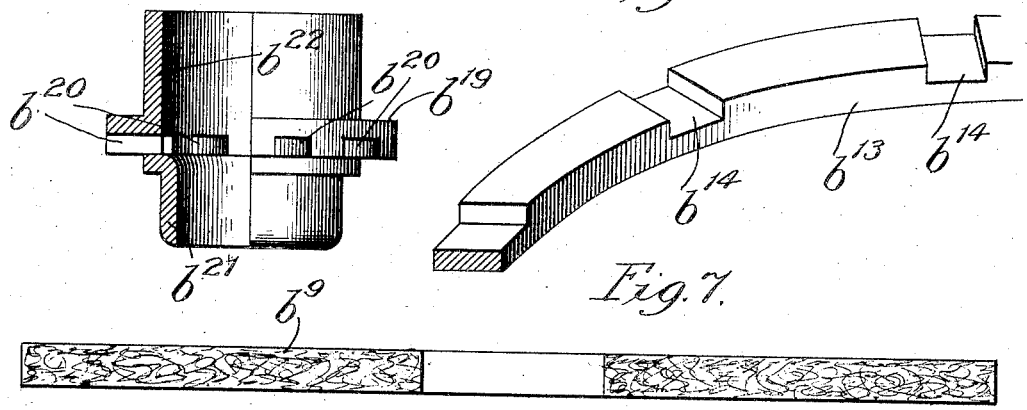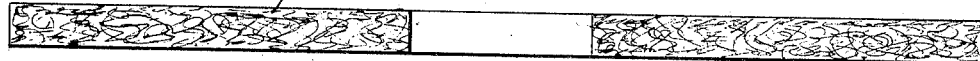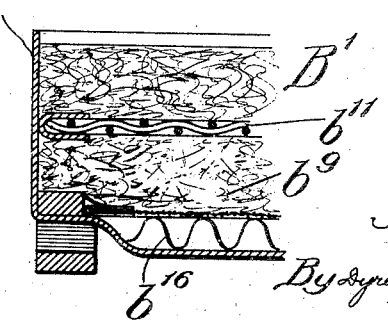

JOHN T. H. PAUL, OF CHICAGO, ILLINOIS, ASSIGNOR TO E. GOLDMAN & CO., INC., OF CHICAGO, ILLINOIS, A CORPORATION OF ILLINOIS.

FILTER.

No. 893,360.   Specification of Letters Patent.   Patented July 14, 1908.

Application filed January 16, 1908.  Serial No. 411,157.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

This invention pertains particularly to filters for use in filtering beer or other liquor.

The primary object of the invention is to provide a simple and comparatively inexpensive filter having provision in each of its several cells for double, or compound, filtration of the liquor, to the end that a more perfectly filtered product may be obtained.

A further object of the invention is to provide a filter, which, while containing the foregoing object, will permit liquor to pass through freely at moderate pressure, thus insuring high capacity and lessening the liability to clog; which will permit of more ready cleansing than filters now in use, thus rendering the filter sanitary as well as readily pervious to liquor; and which shall be of durable construction and little liable to injury in any manner.

The invention is illustrated in its preferred embodiment in the accompanying drawings, in which—

Figure 1 represents a broken vertical sectional view of a filter constructed in accordance with my invention; Fig. 2, a broken plan view of a filter-pan, or cell-pan, employed; Figs. 3 and 4 detail sectional views taken, as indicated, at the corresponding lines on Fig. 2; Fig. 5, a view partly in section and partly in elevation of a conduit - section employed; Fig. 6, a broken perspective view of a packing ring employed; Fig. 7, a sectional view of one of the preparatorily formed disks of filtering material employed; Fig. 8, a broken sectional view illustrating a slight modification.

In the construction illustrated, A represents a casing or cylinder having a bottom $A^1$ and top $A^2$; B, a disk supported on the bottom of the casing and provided with passages serving in the distribution of the liquor as it enters the casing; and $B^1$, filter-cells located between the member B and the top of the casing, and forming with the cylindrical wall of the casing an annular chamber $B^2$ through which the liquor may pass to the several filter-cells.

The casing may be of any approved construction; the bottom of the casing is dished downwardly at its center and provided with a central hollow boss $a$ with which is connected the outlet-pipe $a^1$.

The disk B is equipped with a hub-member which affords a conduit-section $b$ which fits within the upper portion of the hollow boss $a$. A gasket $b^2$ is confined between the conduit-section $b$ and the surface of the bottom $A^1$. The disk B is equipped on its lower side with radial strengthening ribs $b^3$ and spaces are afforded beneath the disk for the passage of liquor to all parts of the annular chamber $B^2$. The bottom $A^1$ is equipped at some distance from its center with a hollow boss $a^2$ with which is connected the inlet-pipe $a^3$.

The conduit-section $b$ is provided at its upper end with an annular recess receiving a gasket or packing $b^4$.

Each cell $B^1$ comprises a cell-pan $b^5$ having a vertical wall or upturned flange $b^6$ at its periphery and provided centrally with a perforation; a conduit-section $b^7$ extending through said central perforation; a retaining ring $b^8$ fitted upon the conduit-section $b^7$, where it is sweated or otherwise secured, said retaining ring serving to secure the conduit-section $b^7$ firmly to the bottom of the cell-pan; a layer or disk of filtering-material $b^9$ supported on the bottom of the pan; a packing-ring $b^{10}$ fitted within the flange $b^6$ of the pan and resting upon the peripheral portion of the bottom of the pan; a distributer element, or coarse-mesh screen, $b^{11}$ resting upon the filter-mass $b^9$; a layer or disk $b^{12}$ of filtering-material confined within the pan and resting upon the distributer element $b^{11}$; and a packing ring $b^{13}$ connected with the marginal portion of the under surface of the bottom of the cell-pan and provided with radial openings $b^{14}$, through which liquor may pass from the cells. The bottom of each cell-pan is provided with a series of suitably spaced radial corrugations $b^{15}$, as shown most clearly in Fig. 2, these radial corrugations intersecting corrugations $b^{16}$ concentric with the axis of the pan. The bottom of the pan is formed with a plane surface $b^{17}$ adjacent to the flange $b^6$, said plane surface being substantially level with the plane of the upper portions of the corrugations of the pan-bottom and adapted to receive the packing ring $b^{10}$. The bottom of the pan is formed adjacent to its central perforation with a plane surface $b^{18}$ which is substantially on a level with the plane of the lower portions of the corrugations of the pan-bottom. The conduit-section $b^7$ is formed with an external flange $b^{19}$, thus providing an enlarged portion of the conduit through which extends radial perforations $b^{20}$, these radial perforations registering with the radial corrugations $b^{15}$ of the pan-bottom. The lower portion $b^{21}$ of the conduit-section $b^7$ is of less diameter than the upper portion $b^{22}$ of the conduit section, so that the successive conduit-sections will fit within each other, as shown. The lower portion of the lowermost conduit-section $b^7$ fits within the upper portion of the conduit-section $b$ and the lowermost packing-ring $b^8$ bears against the packing $b^4$. The external flange $b^{19}$ of the conduit-section affords a packing-ring and shoulder $b^{23}$ which is in vertical alinement with the packing-rings $b^8$ of the several cell-pans. Each distributer element $b^{11}$ preferably comprises an annular coarse-mesh wire screen having a sheet-metal binding-member $b^{24}$ at its inner margin and a sheet-metal binding-member $b^{25}$ at its outer margin. The binding-member $b^{24}$ fits snugly over the upper portion $b^{22}$ of the central conduit-section, and the outer binding-member $b^{25}$ contacts with the inner surface of the vertical flange $b^6$ of the cell-pan. As shown in Fig. 7, the filtering-masses are preparatorily formed in the shape of annular disks, the filtering-material being more tightly compacted at the margins.

It will be noted that the packing-rings $b^{13}$ applied to the lower surfaces of the outer margins of the filter-pans are of somewhat less diameter than the extreme diameters of the filter-pans. In fact, the packing-rings $b^{13}$ applied to the bottom of one cell-pan is adapted to fit within the upper portion of the next lower cell-pan.

The top $A^2$ of the casing is shown connected with an external flange at the top of the cylinder by means of bolts $a^4$. The top is provided centrally with an internal boss $a^5$ adapted to bear against the adjacent end of the uppermost conduit-section $b^7$. Surrounding the boss $a^5$ is a packing-ring $a^6$ in alinement with the central packing-rings heretofore described. Applied to the under surface of the top is a packing-ring $a^7$ which fits within the uppermost cell-pan, said ring $a^7$ having radial perforations $a^8$. The top may be provided with grooves $a^9$ on its inner surface to facilitate the distribution of the liquor in the uppermost cell.

The manner of assembling the filter will be readily understood from the foregoing detailed description. In operation, the liquor enters the casing under pressure through the pipe $a^3$, passes to the annular chamber $B^2$, thence through the perforations $b^{14}$ of the packing-rings $b^{13}$, and thence through the radial corrugations $b^{15}$ and part circular corrugations $b^{16}$ to all portions of the upper surfaces of the filter-masses $b^{12}$. The liquor then passes through the filter-masses $b^{12}$ under pressure to the distributers $b^{11}$, where a fresh distribution of the liquor occurs, after which the liquor passes through the filter-masses $b^9$, thence through the part-circular corrugations $b^{16}$ and radial corrugations $b^{15}$ to the perforations $b^{20}$, whence the liquor escapes through the central conduit of the filter.

It is to be observed that the improved construction provides for tightly compacting the filter-masses adjacent to the inner surfaces of the vertical flanges $b^6$ of the cell-pans. Also, it is to be observed that any fiber carried with the liquor through the minute channels formed by the liquor in its passage through the filter-masses $b^{12}$ will be arrested by the screens, or distributers, $b^{11}$. The pressure lessens, of course, as the liquor nears the outlet, and there is little tendency for any disintegration to occur in the lower filter-masses $b^9$ of each cell, so that splendid results may be obtained without the use of fiber-retaining screens of fine mesh in the bottoms of the cell pans. To render it more practicable to dispense with the fiber-retaining screens in the bottoms of the cell-pans, the corrugations are made deep and narrow, as clearly appears from Figs. 3 and 4. If desired, however, a fiber-retaining screen may be placed in the bottom of each cell-pan, so as to rest upon the corrugations, as shown in Fig. 8. The construction shown in Fig. 8 is, in other respects, the same as shown in the other figures of the drawing, and the parts are similarly lettered.

The foregoing detailed description has been given for clearness of understanding only, and no undue limitation is to be understood therefrom.

What I regard as new, and desire to secure by Letters Patent, is—

1. In a filter, cells having compacted filter-masses of fiber or pulp therein, a distributer element between said filter-masses and lateral ingress and egress conduits located at laterally opposite portions of the filter-masses in each cell, whereby the maximum area of the filtering masses is obtained over and through which the liquid to be filtered will be caused to flow, for the purpose set forth.

2. In a filter, the combination with ingress and egress conduits, of a plurality of cells superposed one above the other, each cell having communication with said ingress conduit, having also communication with said egress conduit, and having interposed filter-masses and a distributer element between said filter-masses, whereby the liquor passing through each cell will receive a plurality of filtrations.

3. In a filter, the combination of a plurality of vertically alined cell-pans or supports having bottoms with grooves on both sides thereof, ingress ports communicating with the grooves on the lower surfaces of the cell-pan bottoms, egress ports communicating with the grooves on the upper surfaces of the cell-pan bottoms, and a plurality of filter-masses in each cell-pan interposed between the bottom thereof and the lower surface of the bottom of the next surmounting cell-pan, with a distributer element interposed between said filter-masses, whereby successive filtrations of liquor may be effected in each of the several cells of the filter.

4. In a filter, the combination of a plurality of vertically alined cell-pans or supports having bottoms with grooves on both sides thereof, a packing-ring at the lower side of each cell-pan adjacent to the periphery thereof adapted to fit into the pan beneath, each packing-ring having passages through its upper portion communicating with the grooves on the lower surfaces of the cell-pan or support bottoms, egress ports communicating with the grooves on the upper surfaces of the cell-pan bottoms, and a plurality of filter-masses in each cell-pan or support interposed between the bottom thereof and the lower surface of the bottom of the next surmounting cell-pan or support, with a distributer element interposed between said filter-masses, whereby successive filtrations of liquor may be effected in each of the several cells of the filter.

5. In a filter, the combination of a plurality of vertically alined cell-pans or supports having corrugated bottoms affording grooves on both sides, each cell-pan having a raised flat marginal portion at the base of the vertical flange [of the pan and having also a central perforation with a depressed flat margin surrounding the same, a conduit-section extending through the central perforation of each pan-bottom and equipped with a flange bearing upon the upper surface of said flat marginal portion of the pan-bottom, each conduit-section having radial openings communicating with the grooves on the upper surface of the pan-bottom, a packing-ring on each conduit-section beneath the pan-bottom through which the conduit-section extends, the lower portion of each conduit-section fitting within the upper portion of the next lower conduit-section, a packing-ring beneath the outer marginal portion of each cell-pan provided with perforations communicating with the grooves on the lower sides of the cell-pans, and a plurality of filter-masses in each cell-pan interposed between the bottom thereof and the lower surface of the bottom of the next surmounting cell-pan, with a distributer element interposed between said filter-masses, whereby successive filtrations of liquor may be effected in each of the several cells of the filter.

6. In a filter, the combination of a plurality of cells, each cell comprising an annular cell-pan having a corrugated bottom, a conduit-section extending through the central opening of each cell-pan bottom and equipped with packing-rings located above and beneath the cell-pan bottom, each conduit-section having openings communicating with the grooves on the upper surface of the cell-pan bottom, the upper portion on each conduit-section receiving the lower portion of the next superposed conduit-section, a packing-ring at the lower outer marginal surface of each cell-pan provided with openings communicating with the grooves on the lower surface of the cell-pan bottom, said last-named packing-ring being of less diameter than the external flanges of the cell-pans, a packing-ring at the bottom of each cell-pan adjacent the inner surface of the outer vertical flange of the cell-pan, a plurality of filter-masses in each cell-pan, and a coarse-mesh annular screen interposed between the filter-masses in each cell-pan and equipped with inner and outer marginal binding members affording packing-rings co-acting with said previously-named packing rings, for the purpose set forth.

7. In a filter-cell, the combination of a cell-pan having a corrugated bottom and provided with a central perforation, the bottom of said cell-pan having an elevated flat marginal portion adjacent the vertical flange of the cell-pan and having a depressed flat marginal portion surrounding the central perforation, a packing-ring applied to the lower surface of the cell-pan bottom at the outer flat marginal portion thereof and provided with radial openings, an externally-flanged conduit-section extending through said central perforation, the flange bearing on the upper surface of the inner flat marginal portion of the cell-pan bottom, the conduit-section having radial perforations communicating with the grooves on the upper surface of the cell-pan bottom, and a packing-ring applied to the conduit-section at the lower surface of the inner flat marginal portion of the cell-pan bottom, and filter-masses and an interposed distributer in said pan, for the purpose set forth.

8. In a filter, the combination of a casing, cells within said casing and forming therewith an annular chamber, ingress ports from the annular chamber to the upper portion of each cell, a central outlet conduit extending through the cells, egress ports opening into said central outlet conduit from the bottom portions of the cells, interposed filter-masses between the ingress and egress ports of each cell, and a distributer element between the filter-masses in each cell.

9. In a filter, the combination of a casing having a lower end equipped centrally with an outlet conduit and at a distance from the center with an inlet conduit, an inner base-plate equipped centrally with a conduit-section in alinement with said outlet conduit, said inner base-plate being ribbed on its lower side, a cell-pan having a corrugated bottom and equipped centrally with a conduit-section whose lower portion fits into the upper portion of said first-named conduit-section, a ring interposed between the outer marginal surface of the cell-pan bottom and the outer marginal portion of said inner base-plate, and a cell-pan having a corrugated bottom and equipped centrally with a conduit-section having its lower portion extending into said second-named conduit-section and equipped also at its outer lower marginal surface with a packing-ring depending into said first-named pan and having radial perforations above the flange of said lower pan, for the purpose set forth.

10. In a filter, the combination of a casing having a lower end equipped centrally with an outlet conduit and at a distance from the center with an inlet conduit, an inner base-plate equipped centrally with a conduit-section in alinement with said outlet conduit, said inner base-plate being ribbed on its lower side, a cell-pan having a corrugated bottom and equipped centrally with a conduit-section whose lower portion fits into the upper portion of said first-named conduit-section, a ring interposed between the outer marginal surface of the cell-pan bottom and the outer marginal portion of said inner base-plate, a cell-pan having a corrugated bottom and equipped centrally with a conduit-section having its lower portion extending into said second-named conduit-section and equipped also at its outer lower marginal surface with a packing-ring depending into said first-named pan and having radial perforations above the flange of said lower pan, and a casing-top equipped centrally with a bearing adapted to close the upper end of the conduit and equipped near its periphery with a packing-ring adapted to fit into the upper portion of a cell-pan, said packing-ring being provided with radial perforations.

JOHN T. H. PAUL.

In presence of—
L. HEISLAR,
R. SCHAEFER.